Figure 1:
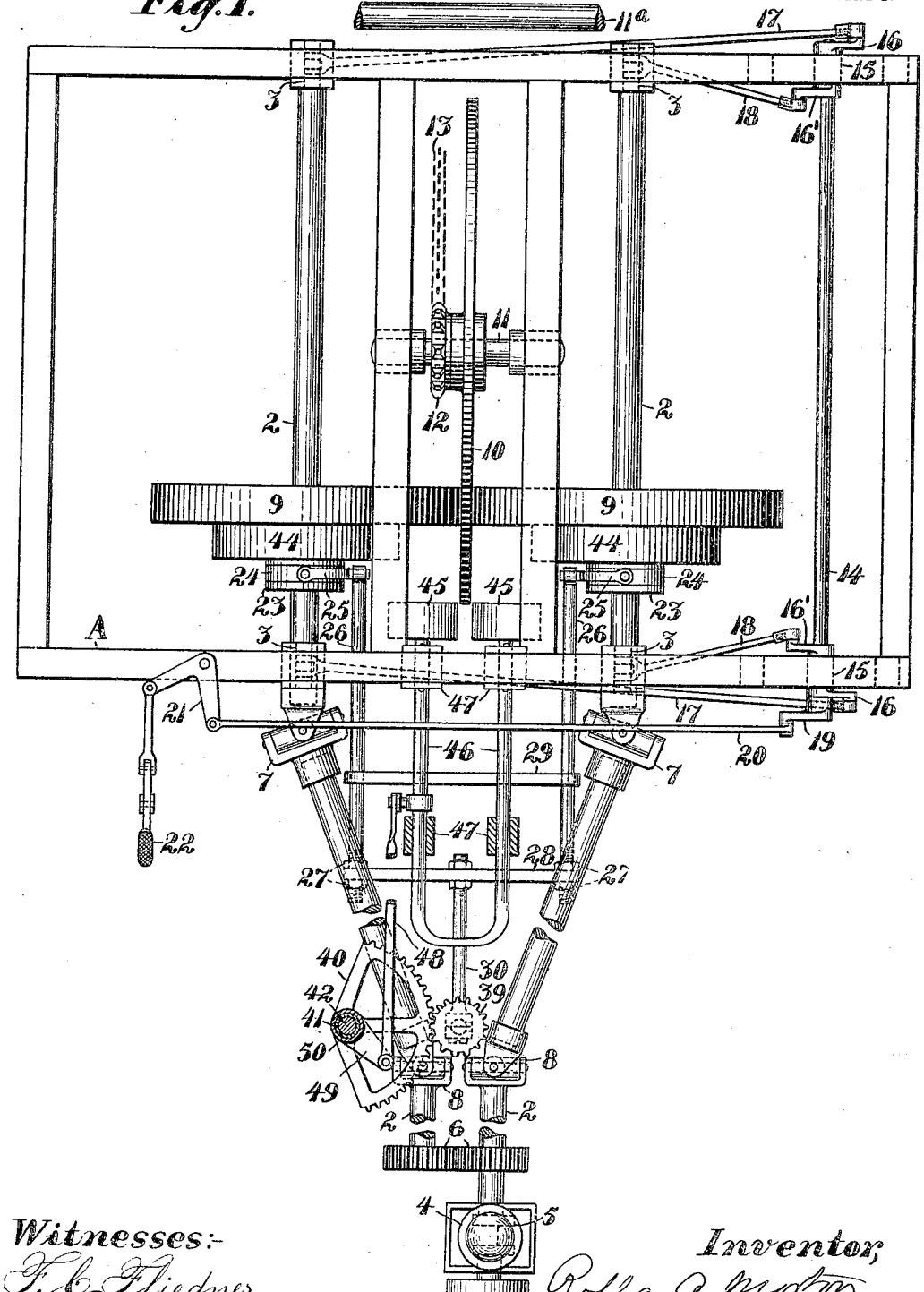

No. 818,107. PATENTED APR. 17, 1906.
R. A. MORTON.
POWER TRANSMISSION MECHANISM.
APPLICATION FILED JUNE 15, 1905.

3 SHEETS—SHEET 1.

Witnesses:—
F. C. Fliedner

Inventor,
Rolla A. Morton
By Geo. H. Strong, atty

No. 818,107. PATENTED APR. 17, 1906.
R. A. MORTON.
POWER TRANSMISSION MECHANISM.
APPLICATION FILED JUNE 15, 1905.
3 SHEETS—SHEET 2.
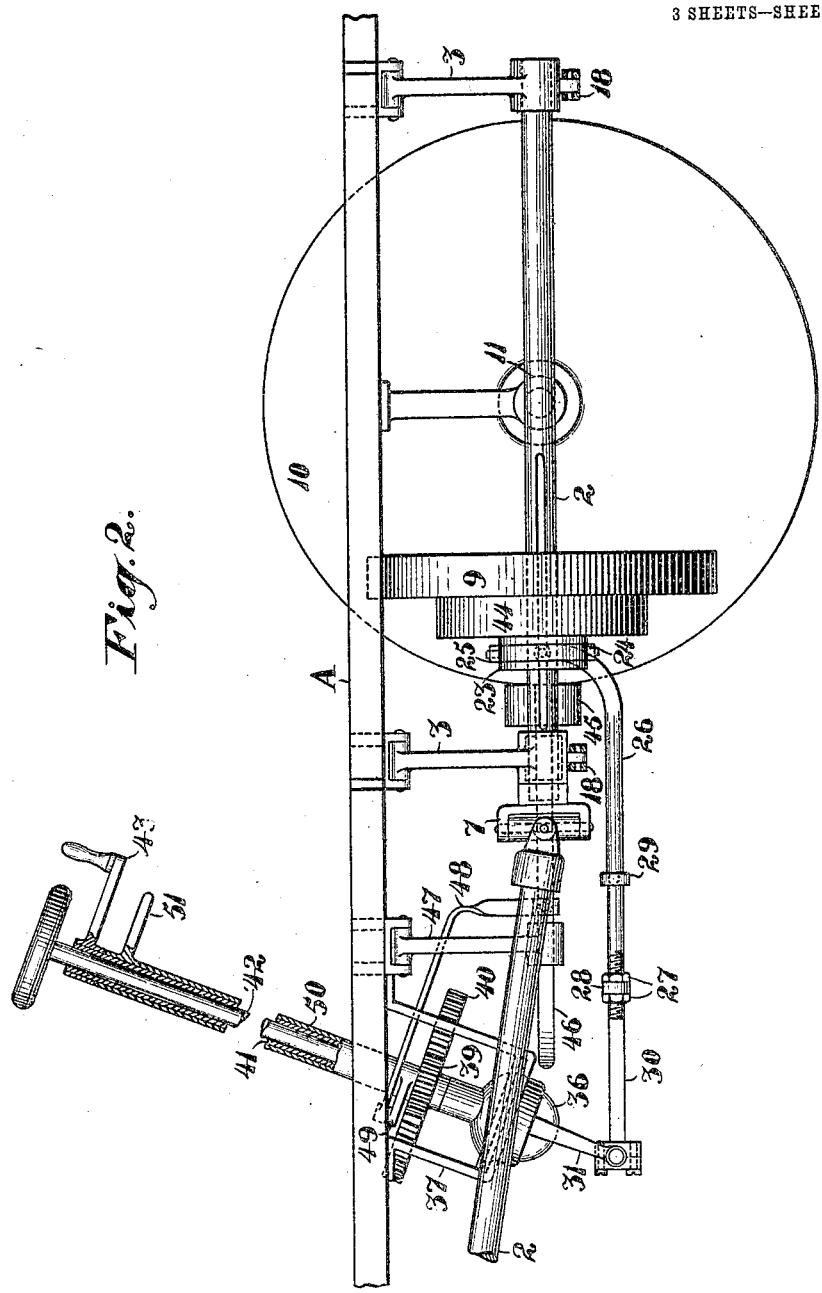
Witnesses:—
F. C. Fliedner
J. Howse
Inventor,
Rolla A. Morton
By Geo. H. Strong.

No. 818,107. PATENTED APR. 17, 1906.
R. A. MORTON.
POWER TRANSMISSION MECHANISM.
APPLICATION FILED JUNE 15, 1905.
3 SHEETS—SHEET 3.
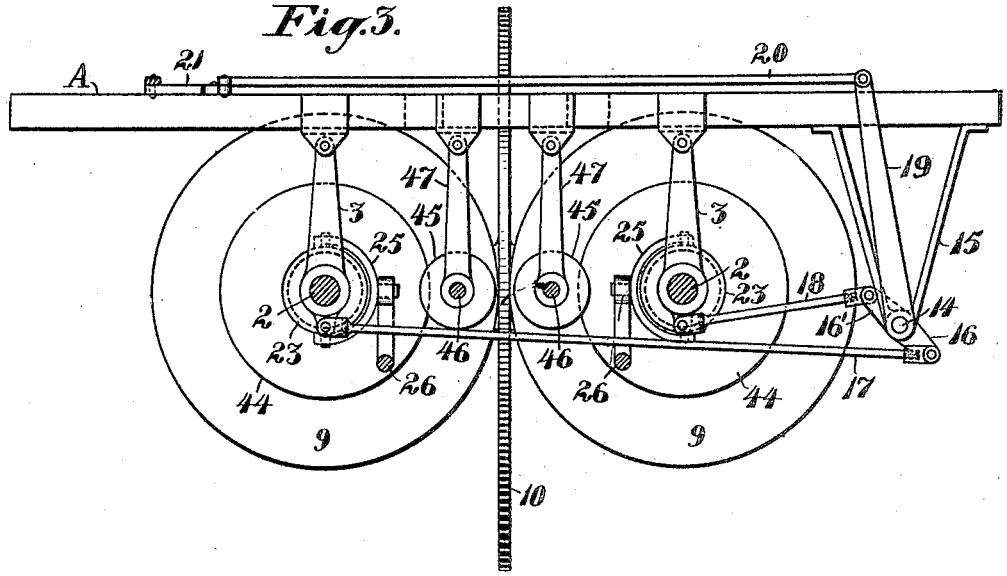
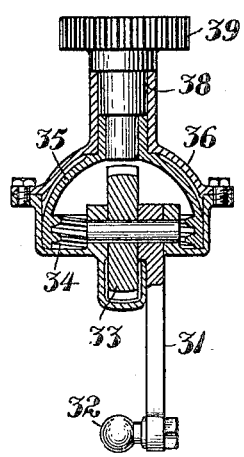
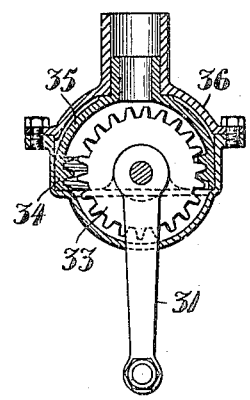
Witnesses:—
F. C. Fliedner
J. H. Howse
Inventor,
Rolla A. Morton
By Geo. H. Strong. Atty.

UNITED STATES PATENT OFFICE.

ROLLA A. MORTON, OF SAN JOSE, CALIFORNIA.

POWER-TRANSMISSION MECHANISM.

No. 818,107.　　　　Specification of Letters Patent.　　　Patented April 17, 1906.

Application filed June 15, 1905. Serial No. 265,348.

*To all whom it may concern:*

Be it known that I, ROLLA A. MORTON, a citizen of the United States, residing at San Jose, in the county of Santa Clara and State of California, have invented new and useful Improvements in Power-Transmission Mechanism, of which the following is a specification.

My invention relates to an improved power transmission, and pertains especially to a form of friction transmission for use with engines of the center-fire balance type illustrated in my former patent, No. 772,109, dated October 11, 1904.

The object of my invention is to provide a simple practical form of friction transmission for use particularly in automobiles, boats, and other conveyances commonly driven by an explosive engine, and which transmission will provide all the advantages and conveniences of a wide range of speed with possibilities of the most unappreciable and gradual changes of speed and with a lack of shock or jar or clash of gears and which will obviate the various defects of other friction transmissions, such as slippage, lack of power, liability to breakage, and general unpracticableness.

The invention consists of the parts and the construction and combination of parts, as hereinafter more fully described and claimed, having reference to the accompanying drawings, in which—

Figure 1 is a plan view of my improved chassis. Fig. 2 is a side elevation of same, omitting the engine and certain other parts. Fig. 3 is a front view of the friction disk and rollers. Fig. 4 is a sectional view of the internal worm-and-pinion mechanism for operating the drive-rollers. Fig. 5 is a view at right angles to the view shown in Fig. 4.

A represents the rigid framework of an automobile or other vehicle, and 2 2 are parallel shafts, here shown as extending parallel with the frame and suitably supported thereon or therefrom and suitably driven, so as to be turnable simultaneously and in opposite directions. These shafts I have shown as journaled in hangers 3, pivoted to each side of the frame A, and the journals for these shafts may be ball-bearing or of any other approved or desirable pattern.

The shafts may be driven by means of a center-fire balance-engine of the type shown in my patent previously mentioned, or, as herein shown, for the sake of simplicity in illustration they may be driven from the single engine 4, in which case one of the shafts 2 is provided with a crank 5, attached to the engine piston-rod, while the other shaft 2 is driven oppositely to the first shaft, but at the same rate of speed, by reason of the engagement of the gears 6 on the two shafts.

Each of the shafts 2 at some suitable points outside of the hangers 3 and adjacent to the engine is provided with two universal joints 7 8 to permit the movement of the shafts with the hangers toward or from one another without interfering with the proper alinement of those portions of the shafts which are either connected with the engine or with each other.

Each shaft between its respective hangers 3 carries a friction-roller 9, turnable with but slidable on the shaft, and both of these rollers 9 are adapted by suitable mechanism hereinafter described to be moved forward and back simultaneously and equally on the shafts and to be moved laterally and oppositely and simultaneously to engage or disengage a driving-disk 10. This disk is fixed to its shaft 11, which is suitably supported or hung from the frame A. From the shaft 11 power is transmitted by any suitable means to the driven shaft 11$^a$, as by the sprocket 12 and chain 13. The lateral movement of the rollers 9 to grip or to release the disk 10 may be effected in a variety of ways.

As here shown a rock-shaft 14, fulcrumed in the brackets 15, hung to one side of the machine and outside of the shafts 2, carries two arms 16. These arms 16 are connected by the adjustable rods 17 to the brackets 3 on the opposite side of the machine. Other arms 16' project up from shaft 14 and are similarly connected by the adjustable rods 18 with the adjacent hangers 3. Extending upward from the rock-shaft and fixed thereto is an arm 19, to which is connected a rod 20, which runs crosswise of the machine and pivots to a bell-crank lever 21, which is operated by a foot-lever 22. The movement of the foot-lever in one direction operates through the described connections to carry the rollers 9 into contact with the disk 10, while an opposite movement of the foot-lever allows the rollers to move outward simultaneously away from the disk. The rollers are shiftable longitudinally on the shafts 2 to allow them to be brought into contact with the disk at points nearer to or farther from the center of the disk, according to the speed at which it is desired to drive the vehicle. With the rollers engaging the disk nearer the periphery of the disk the greater would be the power applied to the disk and the slower the rotation of the shaft 11 than where the rollers engage the disk nearer the axle. This movement of the rollers 9 radially of the disk may be effected by any appropriate means. In the present instance I have shown the following described mechanism: Each roller has a grooved hub 23, with a loose ring 24 in each groove. Each ring is pivotally connected with a forked or Y arm 25, and each Y is turnably supported in the end of respective spring-rods 26. These spring-rods extend forward and have their forward ends threaded to receive the set-nuts 27, which allow them to be suitably adjusted in a cross-head 28. A brace 29 between the rods and adjacent to the cross-head operates to maintain the rods in proper position and also acts as a fulcrum against the resiliency of the spring ends of the rods when the shafts 2 are moved inward to bring the rollers 9 against the disk.

On the release of the foot-lever the natural tendency of the spring-arms 26 would be to carry the rollers outward and free from contact with the disk 10. Thus it is seen that by making the arms 26 springy and by slightly spreading them and supporting them, as shown by the adjustable brace 29, there is no need of any other springs or other mechanisms to hold the rollers 9 away from the disk, since frequently it is desired to let the engine run after the vehicle comes to a standstill.

The pivoting of the Y-pieces to the rings and also to the spring-arms permits of a universality of movement of the parts to adapt them to the various strains to which actual practice subjects them.

The adjustment afforded to the arms 26 by the nuts 27 or equivalent means permits of both the drive-rollers 9 being accurately set, so as to revolve in the same plane and engage the two sides of the disk 10 at exactly opposite points, and thereby achieving best results. The reciprocation of the cross-head 28 to move the rollers radially of the disk is accomplished by any appropriate means. As shown, the rod 30 is connected to the cross-head and to an arm 31, having a swivel connection 32. The arm 31 has a suitable oscillating movement back and forth corresponding to the desired sliding movement of the rollers 9 on their shafts 2. This arm is fixed to the shaft of a gear 33, meshing an internal worm 34. This worm 34 is cut inside of a shell 35, which turns in a suitable box 36, mounted on the bracket 37, hung from the frame. The shell 35 is keyed to a shaft 38, which carries a pinion 39, meshing a segment 40. The segment 40 extends radially from and is fixed to a sleeve 41, which is turnable about the steering-post 42. By means of the hand-lever 43 the sleeve 41 and segment may be turned in either direction, as desired, to operate through the connections with the cross-head 28 to move the rollers 9 radially of disk 10 to vary the speed of the shaft 11. The worm connections of the parts 33 34, together with the segment and pinion, allows this speed-shifting mechanism to be absolutely locked at any desired point to which the lever 43 may be moved, and thus enable the machine to maintain a uniform speed irrespective of the roughness of the road or the amount of jolting to which the parts are subjected.

It is understood that the direction of movement of the shafts 2 is never reversed and that they always revolve equally simultaneously and in opposite directions, so that whenever the rollers 9 are brought into contact with the disk 10 the latter will always rotate in the same direction.

In order to reverse the direction of rotation of the disk 10, and so reverse the direction of travel of the vehicle, the following appropriate means are provided: Each of the shafts 2 carries a smaller roller 44, turnable with and slidable on the shaft. As herein shown, each roller 44 is fixed to and made a part of its corresponding roller 9, whereby the same shifting means serves for both the go-ahead rollers 9 and the reverse-rollers 44. Two normally idle rollers 45, having a diameter in excess of the distance between the perimeter of a roller 44 and the perimeter of its roller 9, are adapted on occasion to be moved in between the rollers 44 and the disk 10 when the foot-lever 22 has been released to throw the rollers 9 away from the disk.

It will be manifest that with rollers 45 interposed between the rollers 44 and disk 10 and suitably maintained in that position if the foot-lever is now thrown forward the rollers 44 will press in on the rollers 45 to bind the latter against the disk 10. At the same time the rollers 9 will remain out of contact with the disk, leaving the rollers 45 to act as idlers to change the direction of rotation of the disk 10.

Any suitable form of support for the rollers 45 and any suitable means for moving these rollers into and out of the range of rollers 44 may be employed. As shown, these rollers are rotatably mounted on the ends of a U-frame 46, carried by swinging brackets 47 on the frame A. The bend of the U-frame 46 is preferably springy.

The reciprocation or oscillation of the frame 46 is effected by means of a rod 48, connecting with an arm 49, fastened to a sleeve 50, which is turnable outside of and independently of the sleeve 41, the turning of the sleeve 50 being effected by a suitable hand-lever 51. By turning the hand-lever 51 in the proper direction with the foot-lever 22 released the rollers 45 are moved in between and clamped by the rollers 44 in the manner just described.

The advantages demonstrated in a practical and successfully-operated machine have been found to be as follows: The construction is simple and there are very few parts to look after or to get out of order. The several parts that may need adjustment are made adjustable, and suitable compensation is made for strains and jars to the apparatus. The vehicle can be driven at any desired speed, and the changes from one speed to another can be made without any shock to the apparatus or to the engine and without any clash of gears, sudden jolts, and like inconveniences incident on ordinary gear transmissions. There is no chance of slippage, since the power is applied simultaneously to both sides of the driving-disk, each drive-roller serving mutually to support the disk against the other and the two rollers acting like a vise, with rolling-jaws to grip the disk. The reversing means is simple and direct.

For purposes of illustration, but not for any purpose of restricting the scope of my claims, I have herein shown my invention in conjunction with an automobile; but obviously it is capable of use in numerous other connections. Moreover, it is possible that various modifications in my invention may be made without departing from the principle thereof, and I do not wish to be understood as limiting myself to the specific construction as herein shown and described.

Having thus described my invention, what I claim, and desire to secure by Letters Patent, is—

1. In a power transmission, the combination with a drive-disk, of friction-rollers arranged upon opposite sides of the disk, means to drive said rollers simultaneously and in opposite directions, and means to move said rollers in unison into and out of engagement with the drive-disk, said last-named means including a rock-shaft having oppositely-extending arms and connections between said arms and the rollers 2. In a power transmission, the combination with a drive-disk, of friction-rollers arranged upon opposite sides of the disk, means to drive said rollers simultaneously and in opposite directions, means to move said rollers in unison into and out of engagement with the drive-disk, said last-named means including a rock-shaft having oppositely-extending arms and connections between said arms and the rollers and means to shift said rollers simultaneously and radially of the disk.

3. In a power transmission, the combination with a drive-disk, of friction-rollers arranged upon opposite sides of the disk, means to drive said rollers simultaneously and in opposite directions, means to move said rollers in unison into and out of engagement with the drive-disk, said last-named means including a rock-shaft having oppositely-extending arms and connections between said arms and the rollers, means to shift said rollers simultaneously and radially of the disk and means other than said rollers to reverse the disk.

4. In power transmission, the combination of two parallel drive-shafts, connections therebetween and a source of power to operate the shafts in opposite directions, a friction-disk between the shafts, slidable rollers on the shafts engageable simultaneously and equally on opposite sides of the disk, and means for moving the rollers into and out of contact with the disk said means including a rock-shaft having oppositely-extending arms, and connections between said arms and the shaft.

5. In power transmission, the combination of two parallel drive-shafts, connections therebetween and a source of power to operate the shafts in opposite directions, a friction-disk between the shafts, slidable rollers on the shafts engageable simultaneously and equally on opposite sides of the disk, means for sliding said rollers in unison and simultaneously on the shafts and means for moving the shafts toward or from each other to carry the rollers into or out of engagement with the disk, said last-named means including a rock-shaft having oppositely-extending arms and connections between these arms and the said shafts.

6. In power transmission, the combination of two parallel drive-shafts, connections therebetween and a source of power to operate the shafts in opposite directions, a friction-disk between the shafts, slidable rollers on the shafts engageable simultaneously and equally on opposite sides of the disk, means for sliding said rollers in unison and simultaneously on the shafts, means for moving the shafts toward or from each other to carry the rollers into or out of engagement with the disk, said last-named means including a rock-shaft parallel with the shafts, and provided with oppositely-extending arms, and connections between said arms and the first-named shafts, and means other than said rollers to reverse the movement of the disk.

7. In a power transmission, the combination of two parallel shafts connected with a source of power and operatable simultaneously in opposite directions, a drive-disk between the shafts, two sets of rollers carried by the shafts slidable thereon and turnable therewith, one set of said rollers arranged to impinge directly on the disk to drive the latter in one direction, and a third set of rollers interposable between the disk and the second set of rollers on the shafts to reverse the disk.

8. In a power transmission, the combination of two parallel shafts connected with a source of power and operatable simultaneously in opposite directions, friction-rollers turnable with and slidable on said shafts, a disk between the shafts and engageable by said rollers to drive the disk in one direction, a second set of rollers turnable with and slidable on the shafts and out of engagement with the disk, and means interposable between said second set of rollers and the disk to reverse the latter.

9. In a power transmission, the combination of two parallel shafts connected with a source of power and operatable simultaneously in opposite directions, friction-rollers turnable with and slidable on said shafts, a disk between the shafts and engageable by said rollers to drive the disk in one direction, a second set of rollers turnable with and slidable on the shafts and out of engagement with the disk, and means interposable between said second set of rollers and the disk to reverse the latter, said reversing means comprising a pair of idle rollers.

10. In a power transmission, the combination of two parallel shafts connected with a source of power and operatable simultaneously in opposite directions, friction-rollers turnable with and slidable on said shafts, a disk between the shafts and engageable by said rollers to drive the disk in one direction, a second set of rollers turnable with and slidable on the shafts and out of engagement with the disk, means interposable between said second set of rollers and the disk to reverse the latter, said reversing means comprising a pair of idle rollers, means for shifting all of said rollers radially of the disk, and means for moving all of said rollers laterally of the disk.

11. In power transmission, the combination with a vehicle-frame, a pair of parallel shafts hung therefrom so as to be movable to and from each other, means for rotating said shafts simultaneously and oppositely, friction-rollers turnable with and slidable on the shafts, a drive-disk between and engagable by the friction-rollers, means for moving said rollers laterally of the disk to cause the rollers to impinge equally and simultaneously on opposite sides of the disk, or to move out of engagement therewith, and means for shifting said rollers radially of the disk, said last-named means including a spring-frame connected with each of the rollers and means for reciprocating said frame.

12. In power transmission, the combination with a vehicle-frame, a pair of parallel shafts hung therefrom so as to be movable to and from each other, means for rotating said shafts simultaneously and oppositely, friction-rollers turnable with and slidable on the shafts, a drive-disk between and engagable by the friction-rollers, means for moving said rollers laterally of the disk to cause the rollers to impinge equally and simultaneously on opposite sides of the disk, or to move out of engagement therewith, means for shifting said rollers radially of the disk, said last-named means including a spring-frame connected with each of the rollers and operating normally to carry them out of engagement with the disk, and means for reciprocating said frame.

13. In a friction transmission, the combination with a pair of parallel shafts connected with a source of power and operatable simultaneously in opposite directions, friction-rollers turnable with and slidable on the shafts, a drive-disk between the rollers, means for moving the shafts to carry the rollers into and out of engagement with the disk, a frame connected with the rollers, said frame comprising parallel spring-rods, means connecting one end of said rods with the rollers, means connecting the other ends of the rods with each other, and an intermediate brace forming a fulcrum for the rods, an operating-lever and connections between said lever and frame to reciprocate the latter to move the rollers radially of the disk.

14. In a friction transmission, the combination with a pair of parallel shafts connected with a source of power and operatable simultaneously in opposite directions, friction-rollers turnable with and slidable on the shafts, a drive-disk between the rollers, means for moving the shafts to carry the rollers into and out of engagement with the disk, a frame connected with the rollers, said frame comprising parallel spring-rods, means connecting one end of said rods with the rollers, means connecting the other ends of the rods with each other, and an intermediate brace forming a fulcrum for the rods, an operating-lever and connections between said lever and frame to reciprocate the latter to move the rollers radially of the disk, said connections including a segment and pinion substantially as described.

15. In a friction transmission, the combination of a drive-shaft, two rollers turnable therewith and slidable thereon, said rollers of different diameters, a drive-disk engageable by the larger roller to drive the disk in one direction, and an idle roller interposable between the disk and the smaller roller to reverse the disk.

16. In a friction transmission, a drive-disk, a drive-shaft, two rollers on said shaft one larger than the other, means for rotating the shaft, means for moving the shaft laterally of the disk to bring the larger roller into or out of engagement with the disk, and an idle roller interposable between the disk and the smaller of said rollers on the shaft.

17. In a friction transmission, a drive-disk, a drive-shaft, two rollers on said shaft one larger than the other, means for rotating the shaft, means for moving the shaft laterally of the disk to bring the larger roller into or out of engagement with the disk, and an idle roller interposable between the disk and the smaller of said rollers on the shaft, the combined length of the diameter of said idle roller and the radius of said smaller roller being greater than the radius of the larger roller.

18. In a friction transmission, a disk, a drive-shaft, means for rotating said shaft, a roller turnable with and slidable on the shaft and engageable with the disk, and means for reciprocating the roller radially of the disk, said means including a spring part operating normally to carry the roller out of engagement with the disk, a radial arm connected with said part, a worm and gear to operate said arm, a pinion connected with the worm, a segment meshing said pinion and an operating-lever for said segment.

In testimony whereof I have hereunto set my hand in presence of two subscribing witnesses.

ROLLA A. MORTON.

Witnesses:
E. W. KNAPP,
B. E. KNAPP.